United States Patent
Wu et al.

(10) Patent No.: US 8,410,202 B1
(45) Date of Patent: Apr. 2, 2013

(54) COATING COMPOSITIONS

(75) Inventors: Jin Wu, Pittsford, NY (US); Lanhui Zhang, Webster, NY (US); Lin Ma, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/280,088

(22) Filed: Oct. 24, 2011

(51) Int. Cl.
- *C08K 5/34* (2006.01)
- *C08K 5/00* (2006.01)
- *C08K 5/02* (2006.01)
- *C08K 5/05* (2006.01)
- *C08K 5/07* (2006.01)
- *C08G 18/42* (2006.01)
- *C08G 77/00* (2006.01)
- *C08F 283/00* (2006.01)
- *C08J 3/09* (2006.01)

(52) U.S. Cl. ........ 524/104; 524/500; 524/113; 524/210; 524/356; 524/391; 524/464; 525/417; 525/474

(58) Field of Classification Search .................. 524/356
See application file for complete search history.

(56) References Cited

U.S. PATENT DOCUMENTS

| | | | | |
|---|---|---|---|---|
| 3,950,588 | A | * | 4/1976 | McDougal ...................... 442/80 |
| 5,978,639 | A | | 11/1999 | Masuda et al. |
| 6,139,784 | A | | 10/2000 | Oshima et al. |
| 6,397,034 | B1 | | 5/2002 | Tarnawskj et al. |
| 6,620,905 | B1 | * | 9/2003 | Musa ............................. 528/423 |
| 7,031,647 | B2 | | 4/2006 | Mishra et al. |
| 7,130,569 | B2 | | 10/2006 | Goodman et al. |
| 7,139,519 | B2 | | 11/2006 | Darcy, III et al. |
| 7,163,482 | B2 | * | 1/2007 | Sarkar et al. ................... 475/159 |
| 2010/0149262 | A1 | * | 6/2010 | Lin et al. ........................ 347/45 |
| 2010/0204385 | A1 | * | 8/2010 | Kreiling et al. ............... 524/500 |

OTHER PUBLICATIONS

Karis et al., "Perfluoropolyether characterization by nuclear magnetic resonance spectroscopy and gel permeation chromatography," J. Flu. Chem. 118, 81, 84, 91 (2002).*

* cited by examiner

*Primary Examiner* — David W Wu
*Assistant Examiner* — Josephine L Chang
(74) *Attorney, Agent, or Firm* — Eugene O. Palazzo

(57) ABSTRACT

A mixture of a functionalized polyfluoropolyether and a benzoxazine resin in a weight ratio of from about 1/99 to about 99/1.

18 Claims, No Drawings

COATING COMPOSITIONS

COATING COMPOSITIONS

This disclosure is generally directed to novel compositions that are useful as surface coatings for xerographic and non-xerographic system components, such as fusers, photoconductors, self-cleaning intermediate transfer members, belts, and ink jet print heads included in these systems.

BACKGROUND

In electrophotographic and ink jet printing processes a number of the components selected require surfaces that are uniform, durable, and that have a low surface energy enabling excellent release characteristics. Also, hydrophobic and oleophobic surface layers are desirable for assisting in toner transfer and in the cleaning efficiency of the imaging member photoconductor. While fluorinated polymeric layers are usually hydrophobic, they are not considered sufficiently oleophobic for electrophotographic, such as xerographic processes and ink jet printing processes. Thus, surface layers that are both hydrophobic and oleophobic are continuously being investigated.

Other disadvantages associated with various known coatings are that they lack extended lifetimes, have poor suitably consistent dimensional stabilities, possess in some instances unacceptable water absorption properties, dielectric constants that are higher than desired, and low temperature resistance characteristics.

Additionally, numerous known coatings decompose after minimum usage, and thus are not economical thereby resulting in the necessity of having such coatings continuously replaced.

Further, a number of known coatings suitable for various surfaces are not multidimensional in that they can be only used for the coating of less than a sufficient number of surfaces and substrates.

Many known intermediate transfer member coatings and xerographic fuser coatings exhibit poor performance properties when repeatedly used, and these coatings because they degrade are ineffective with nominal utilization.

There is a need for coatings that substantially avoid or minimize the disadvantages of a number of known coatings.

Also, there is a need for stable coatings that have a number of different uses.

Further, there is a need for surface coatings that can be economically and efficiently manufactured with acceptable lifetime properties.

There is another need for compositions that are useful as xerographic system surface component coatings for fusers, self-cleaning intermediate transfer members, belts, photoconductors, ink jet print heads, and the like.

These and other needs are achievable in embodiments with the compositions disclosed herein.

SUMMARY

Disclosed herein is a composition comprising a mixture of a functionalized polyfluoropolyether and a benzoxazine resin with the weight ratio of the functionalized polyfluoropolyether to the benzoxazine resin being from about 1/99 to about 99/1.

Also, disclosed is a composition comprising a surface layer comprising a crosslinked network of a functionalized polyfluoropolyether and a benzoxazine resin with a weight ratio of the functionalized polyfluoropolyether to the benzoxazine resin being from about 20/80 to about 80/20, and wherein the surface layer possesses a water contact angle of from about 90° to about 150°, and a hexadecane contact angle of from about 45° to about 95°.

In aspects of the present disclosure, there is provided a process for the preparation of a coating mixture comprising reacting a functionalized polyfluoropolyether, a benzoxazine polymer, and a catalyst thereby forming a crosslinked mixture of a functionalized polyfluoropolyether having chemically attached thereto a benzoxazine polymer, and where the weight ratio of the polyfluoropolyether to the benzoxazine is from about 1/99 to about 99/1.

EMBODIMENTS

There is disclosed herein a coating composition and a surface layer thereof comprised of a functionalized polyfluoropolyether (PFPE) and a benzoxazine resin in, for example, a weight ratio of from about 1/99 to about 99/1, from about 10/90 to about 90/10, or from about 20/80 to about 80/20, and which compositions are dispersed/dissolved in a solvent, and wherein the surface layer has a water contact angle of, for example, from about 90° to about 150°, from about 95° to about 130°, or from about 110° to about 125°, and a hexadecane contact angle of from about 45° to about 95°, from about 55° to about 80°, or from about 65° to about 75°.

Further, disclosed herein are novel hydrophobic and oleophobic coating compositions that are useful as surface layers. The coating compositions include a functionalized polyfluoropolyether (PFPE)/benzoxazine resin composite in a weight ratio of, for example, from about 1/99 to about 99/1, from about 10/90 to about 90/10, from about 20/80 to about 80/20, from about 25/75 to about 60/40, or from about 30/70 to about 45/55 dispersed in a solvent. The functionalized PFPE reacts with the benzoxazine polymer or resin, optionally in the presence of a catalyst, and where the reaction is conducted by heating at, for example, from about 100° C. to about 250° C., from about 120° C. to about 200° C., or from about 140° C. to about 175° C. for a suitable time period until there is chemically bonded and attached to the benzoxazine the polyfluoropolyether, and which time is, for example, from about 10 to about 240 minutes, from about 20 to about 180 minutes, or from about 30 to about 120 minutes. The surface layer coating compositions resulting are believed to be a crosslinked network of the functionalized polyfluoropolyether and the benzoxazine polymer.

The functionalized polyfluoropolyether (PFPE) selected for the compositions and the processes disclosed herein, and that are mixed, or reacted with benzoxazine resin for the formation of the hydrophobic/oleophobic composites are represented by the following formulas or mixtures thereof

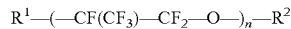

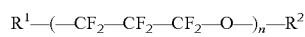

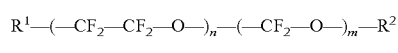

or

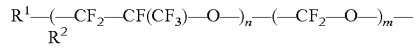

wherein n and m each represents the number of repeating groups, and n is, for example, a number inclusive of fractions thereof, of from about 3 to about 120, from about 10 to about 100, or from about 10 to about 60; m is, for example, from about 5 to about 120, from about 12 to about 105, or from about 10 to about 60, with the sum of n+m being, for example, from about 40 to about 180, from about 75 to about 150, or from about 80 to about 125; the ratio of n/m being, for example, from about 0.1 to about 3, or from about 0.5 to about 2, $R^1$ and $R^2$ are independently represented by $A_1$—$CF_2O$— and —$CF_2$—$A^2$, respectively, and $A_1$, $A_2$ are independently one of —$A_k$—OH —$CH_2(OCH_2CH_2)_p$OH

—$CH_2OCH_2CH(OH)CH_2OH$

—$COOR_H$

—$A_k$—$Si(OR_H)_3$ or

—$A_k$—$OP(O)(OH)_2$ wherein $A_k$, depending on the valences, is a chemical bond or an alkylene group with, for example, from about 1 to 10 carbon atoms or from 2 to about 7 carbon atoms, $R_H$ is H, or an alkyl group with, for example, from about 1 to about 20 carbon atoms or from about 1 to about 10 carbon atoms, and p is, for example, from about 1 to about 20, from 1 to about 16, from about 1 to about 12, from about 2 to about 18, or from about 1 to about 10.

In embodiments, the polyfluoropolyether is represented by the following formulas/structures $HOCH_2OCF_2(CF_2CF_2CF_2O)_nCF_2CH_2OH$ or $HOOCOCF_2(CF_2CF_2CF_2O)_nCF_2COOH$ wherein n represents the number of repeating groups, and optionally is a number of from about 3 to about 25, or from 7 to about 15.

Also, in embodiments of the present disclosure the functionalized polyfluoropolyethers are represented by at least one of the following formulas/structures $R^1$—(—$CF(CF_3)$—$CF_2$—O—)$_n$—$R^2$ $R^1$—(—$CF_2$—$CF_2$—$CF_2$—O—)$_n$—$R^2$ $R^1$—(—$CF_2$—$CF_2$—O—)$_n$—(—$CF_2$—O—)$_m$—$R^2$ and $R^1$—(—$CF_2$—$CF(CF_3)$—O—)$_n$—(—$CF_2$—O—)$_m$—$R^2$.

Examples of functionalized polyfluoropolyethers (PFPE) included in the compositions disclosed herein are hydroxyl terminated PFPE, carboxyl acid or ester terminated PFPE, silane terminated PFPE, or phosphoric acid terminated PFPE, each with a weight average molecular weight as determined by GPC analysis of from about 100 to about 5,000, from about 200 to about 3,000, from about 200 to about 1,000, or from about 500 to about 2,000, and the number average molecular weight thereof as determined by GPC analysis is from about 100 to about 2,000, or from about 500 to about 1,000, and present in an amount of, for example, from about 20 to about 80 weight percent, from about 25 to about 60 weight percent, or from about 30 to about 45 weight percent of the coating composition solids.

Examples of hydroxyl terminated PFPE's that can be selected for the compositions and processes illustrated herein include FLUOROLINK® D ($M_w$=1,000, functional group —$CH_2OH$ and fluorine content ~62 percent), FLUOROLINK® D10-H ($M_w$=700, functional group —$CH_2OH$ and fluorine content ~61 percent), FLUOROLINK® D10 ($M_w$=500, functional group —$CH_2OH$ and fluorine content ~60 percent), FLUOROLINK® E ($M_w$=1,000, functional group —$CH_2(OCH_2CH_2)_pOH$ and fluorine content ~58 percent), FLUOROLINK® E10 ($M_w$=500, functional group —$CH_2(OCH_2CH_2)_pOH$ and fluorine content ~56 percent), FLUOROLINK® T ($M_w$=550, functional group —$CH_2OCH_2CH(OH)CH_2OH$ and fluorine content ~58 percent), FLUOROLINK® T10 ($M_w$=330, functional group —$CH_2OCH_2CH(OH)CH_2OH$ and fluorine content ~55 percent), and the like, and mixtures thereof, all commercially available from Solvay Chemical Company.

Carboxyl acid or ester terminated PFPE examples selected for the disclosed coating compositions and processes include FLUOROLINK® C10 ($M_w$=1,000, functional group —COOH and fluorine content ~61 percent), FLUOROLINK® L ($M_w$=1,000, functional group —$COOR_H$ and fluorine content ~60 percent), FLUOROLINK® L10 ($M_w$=500, functional group —$COOR_H$ and fluorine content ~58 percent), and the like, and mixtures thereof, all commercially available from Solvay Chemical Company.

Silane terminated PFPE examples that can be incorporated into the coatings and processes disclosed include FLUOROLINK® S10 ($M_w$=1,750 to 1,950, functional group —$A_k$—$Si(OCH_2CH_3)_3$), and the like, and mixtures thereof, all commercially available from Solvay Chemical Company.

Examples of phosphoric acid terminated PFPEs selected for the coating compositions and processes illustrated herein include FLUOROLINK® F10 ($M_w$=2,400 to 3,100, functional group —$A_k$—$OP(O)(OH)_2$), and the like, and mixtures thereof, all commercially available from Solvay Chemical Company.

The benzoxazine polymers or resins selected for the compositions, and for the formation of the hydrophobic/oleophobic composites disclosed include bisphenol A benzoxazine resin, bisphenol F benzoxazine resin, phenolphthalein benzoxazine resin, thiodiphenol benzoxazine resin, dicyclopentadiene benzoxazine resin, which resins can be represented by the following single or repeating structures/formulas or mixtures thereof

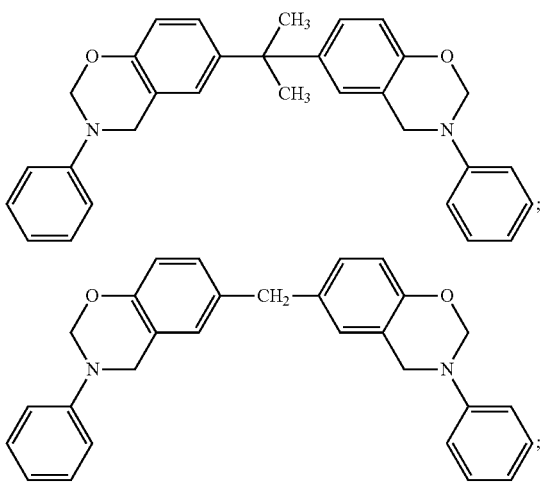

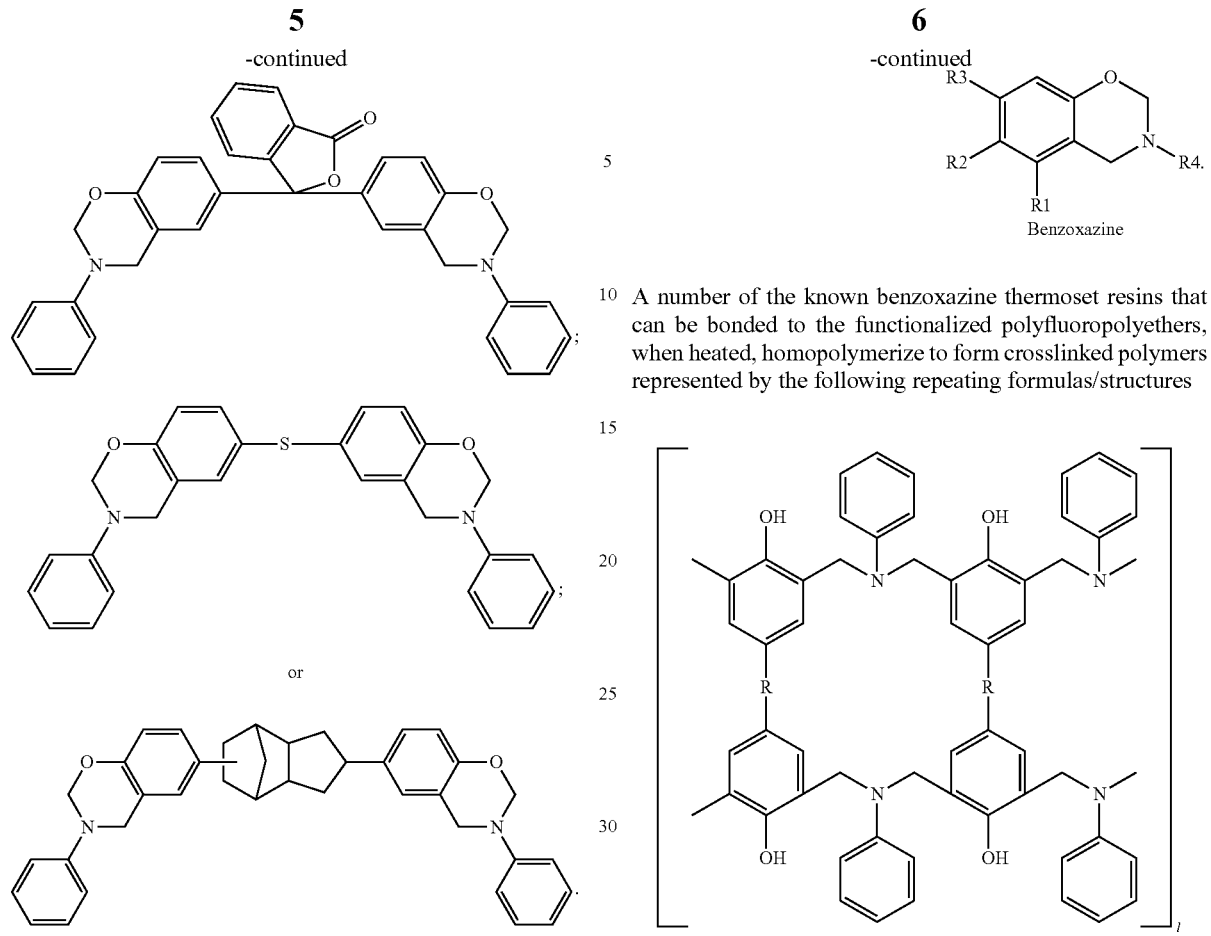

Benzoxazine resins are commercially available from Huntsman Advanced Materials Americas Inc., The Woodlands, Tex. under the trade name of ARALDITE®, such as bisphenol A benzoxazine resin (ARALDITE® 35600), bisphenol F benzoxazine resin (ARALDITE® 35700), phenolphthalein benzoxazine resin (ARALDITE® 35800), thiodiphenol benzoxazine resin (ARALDITE® 35900), and dicyclopentadiene benzoxazine resin (ARALDITE® 36000). Benzoxazine resins are also commercially available from Henkel as HENKEL® 99110 and 99120.

The benzoxazines resins are, in general, generated from the reaction products of an amine, a phenol and formaldehyde as illustrated below in Scheme 1, wherein R1, R2, R3 and R4 are appropriate substituents, such as alkyl, aryl, and the like with the resulting products of the functionalized polyfluoropolyethers, and the benzoxazines exhibiting, it is believed, excellent performance properties including dimensional stability, low water absorption, low dielectric constant, and high temperature resistance Scheme 1

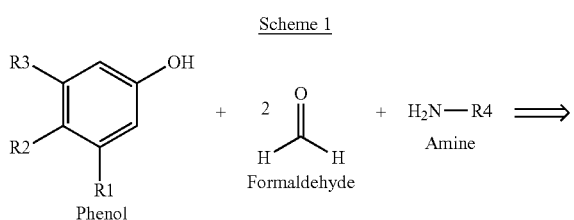

A number of the known benzoxazine thermoset resins that can be bonded to the functionalized polyfluoropolyethers, when heated, homopolymerize to form crosslinked polymers represented by the following repeating formulas/structures wherein R is an appropriate substituent, such as alkyl, aryl, and the like.

The functionalized PFPE can chemically react with the benzoxazine to form a crosslinked PFPE/benzoxazine composite. For example, the hydroxyl terminated PFPE reacts with the benzoxazine to form ether linkages between the PFPE and the benzoxazine; the carboxyl or ester terminated PFPE reacts with the benzoxazine to form ester linkages between the PFPE and the benzoxazine; the silane terminated PFPE reacts with the benzoxazine to form siloxane linkages between the PFPE and the benzoxazine; or the phosphoric acid terminated PFPE reacts with the benzoxazine to form phosphate linkages between the PFPE and the benzoxazine. Also, in a variation of the process of preparation disclosed the functionalized, such as hydroxyl terminated PFPE, can be chemically attached onto the self crosslinked benzoxazine resin to form a crosslinked composite coating with a crosslinking value of from about 60 to about 99 percent, from about 70 to about 95 percent, or from about 80 to about 90 percent as estimated with an electron microscope.

The benzoxazine weight average molecular weight is as illustrated herein with reference to the formulas and structures disclosed, and which weight average is, for example, from about 450 to about 3,000, from about 1,000 to about 2,000, or from about 1,200 to about 1,500, as determined by GPC analysis, with the number average molecular weight thereof being as illustrated herein with reference to the formulas and structures disclosed, such as for example, from about 400 to about 2,000, from about 1,000 to about 1,700, or from about 1,200 to about 1,500, as determined by GPC analysis.

Suitable optional catalysts selected for the reaction and that remain in the coating composition include organo tin catalysts such as dibutyltin laurate, acid catalysts such as p-toluenesulfonic acid, or base catalysts such as triethylamine, present in an amount of from about 0.01 to about 5 weight percent, or from about 0.1 to about 1 weight percent.

Suitable optional solvents for inclusion in the coating mixture include methyl ethyl ketone, 1-butanol, xylene, methyl isobutyl ketone (MIBK), N,N-dimethylformamide, N-methylpyrrolidone, tetrahydrofuran, toluene, hexane, cyclohexane, heptane, N,N'-dimethylacetamide, methylene chloride, and mixtures thereof, present in an amount of from about 10 to about 90 weight percent, or from about 30 to about 60 weight percent of the coating mixture. When coated on substrate, followed by subsequent drying, the solvent evaporates and the functionalized PFPE/benzoxazine crosslinks, resulting in the formation of a crosslinked PFPE/benzoxazine coating composition.

Not wanting to be limited by theory, it is believed that since the fluoro segments (PFPE) and the benzoxazine are chemically linked at the ends, macro phase separation is prevented. However, micro phase separation occurs in the coating composite, which results in a hydrophobic and oleophobic coating. The phrase hydrophobic/hydrophobicity refers to the wettability behavior of a surface that, for example, has a water contact angle of approximately 90° or more as disclosed herein; and the phrase oleophobic/oleophobicity refers, for example, to the wettability behavior of a surface that has a hexadecane contact angle of approximately 45° or more as disclosed herein.

The hydrophobic and oleophobic crosslinked coating mixture or solution composite disclosed herein can be coated on a variety of substrates including metals such as stainless steel, copper, nickel, or aluminum; plastics such as polyesters, or polyimides; rubbers such as silicones, or glass. More specifically, the crosslinked coating compositions composite illustrated here can be selected for electrophotographic imaging apparatuses, including digital, image on image, and the like as well as in ink jet print heads and transfer drums, and as xerographic intermediate transfer members.

The coating mixture or solution can be coated in any suitable known manner. Typical techniques for coating such mixtures on various substrate layers include flow coating, liquid spray coating, dip coating, wire wound rod coating, fluidized bed coating, powder coating, electrostatic spraying, sonic spraying, blade coating, molding, laminating, and the like.

For example, a coating mixture or solution can be prepared by mixing about 70 weight percent of the benzoxazine and about 30 weight percent of a hydroxyl terminated polyfluoropolyether in methyl isobutyl ketone (MIBK). The solution is then heated and refluxed for a period of from about 4 to about 8 hours. The resulting coating mixture or solution is then draw bar coated on a 75 micron polyimide film, and subsequently dried at temperatures of from about 120° C. to about 200° C. for a period of from about 10 to about 180 minutes. A coating composition of crosslinked benzoxazine/polyfluoropolyether in a ratio of about 70/30 is formed on top of the polyimide substrate, and which coating has a thickness of from about 1 to about 400 microns, of from about 50 to about 275 microns, or from about 100 to 190 microns.

Specific embodiments will now be described in detail. These examples are intended to be illustrative, and not limited to the materials, conditions, or process parameters set forth in these embodiments. All parts are percentages by solid weight unless otherwise indicated.

EXAMPLE

Experimentally, the hydroxyl terminated PFPE (Fluorolink® D, Solvay) was mixed with the self crosslinkable benzoxazine resin (Henkel 99120) in a weight ratio of 30/70 in methyl isobutyl ketone (MIBK). The resulting cloudy solution was heated and refluxed for 6 hours after which the clear coating solution obtained was applied on a polyimide substrate via a draw bar coater, and subsequently cured at 180° C. for 60 minutes. A 10 μm thick composite flexible coating was obtained that possessed a pencil hardness of 1 H, indicating excellent mechanical properties primarily because of the crosslinking nature of the coating.

The obtained composite coating was further tested for contact angles, and the results are provided in Table 1, together with the comparative data of a PTFE film. The advancing contact angles of water and hexadecane were measured at ambient temperature (about 23° C.), using the Contact Angle System OCA (Dataphysics Instruments GmbH, model OCA15). At least ten individual measurements were performed with their averages thereof being shown in Table 1.

TABLE 1

|  | PFPE/Benzoxazine Composite | PTFE |
|---|---|---|
| Water Contact Angle | 105° ± 1° | 110° |
| Hexadecane Contact Angle | 70° ± 1° | 45° |

Compared with PTFE, the disclosed PFPE/benzoxazine composite exhibited a comparable water contact angle as the hydrophobic PTFE. Also, the disclosed PFPE/benzoxazine composite exhibited about a 25° higher hexadecane contact angle than the PTFE, which indicates that the disclosed PFPE/benzoxazine composite was more oleophobic than PTFE.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

What is claimed is:

1. A composition consisting of a mixture of a functionalized polyfluoropolyether and a benzoxazine resin with the weight ratio of said functionalized polyfluoropolyether to said benzoxazine resin being from about 1/99 to about 99/1.

2. A composition consisting of a mixture of a functionalized polyfluoropolyether and a benzoxazine resin with the weight ratio of said functionalized polyfluoropolyether to said benzoxazine resin being from about 1/99 to about 99/1 wherein a solvent is present and is selected from the group consisting of methyl isobutyl ketone, methyl ethyl ketone, 1-butanol, xylene, N,N-dimethylformamide, N-methylpyrrolidone, tetrahydrofuran, toluene, hexane, cyclohexane, heptane, N,N'-dimethylacetamide, methylene chloride, and mixtures thereof.

3. A composition in accordance with claim 1 wherein the functionalized polyfluoropolyether is at least one of

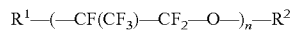

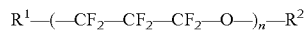

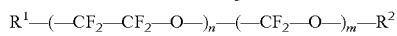

and

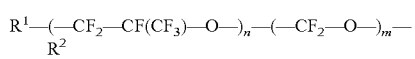

wherein n and m each represents the number of repeating groups; n is from about 3 to about 120; m is from about 5 to about 120, and the sum of n and m is from about 40 to about 180; $R^1$ and $R^2$ are independently represented by $A_1$—$CF_2O$— and —$CF_2$—$A_2$, respectively, and $A_1$ and $A_2$ are independently at least one of

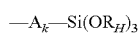

and

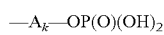

wherein $A_k$, depending on the valences, is a chemical bond or an alkylene group with from about 1 to 10 carbon atoms; $R_H$ is H, or an alkyl group with from about 1 to about 10 carbon atoms, and p is from 1 to about 20.

4. A composition in accordance with claim 1 wherein the functionalized polyfluoropolyether is one of a hydroxyl terminated polyfluoropolyether, a carboxyl acid or an ester terminated polyfluoropolyether, a silane terminated polyfluoropolyether, and a phosphoric acid terminated polyfluoropolyether.

5. A composition in accordance with claim 1 wherein the benzoxazine polymer is at least one of

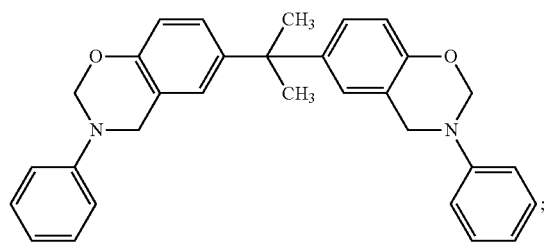

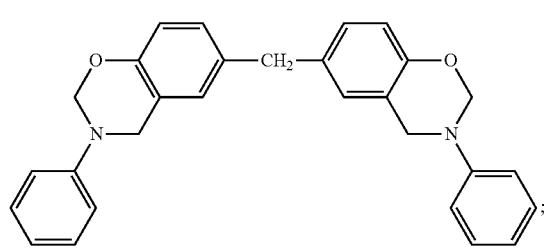 [SMILES: c1ccc(N2COc3ccc(Cc4ccc5c(c4)CN(c4ccccc4)CO5)cc3C2)cc1]

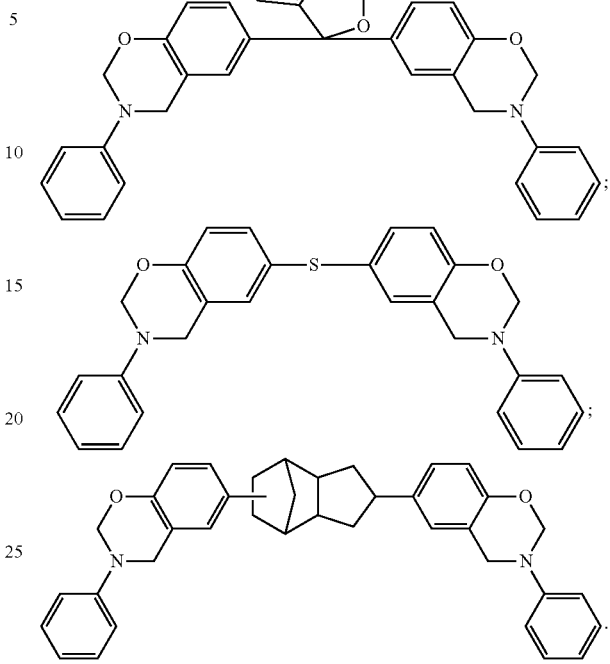

6. A composition in accordance with claim 1 wherein the benzoxazine is

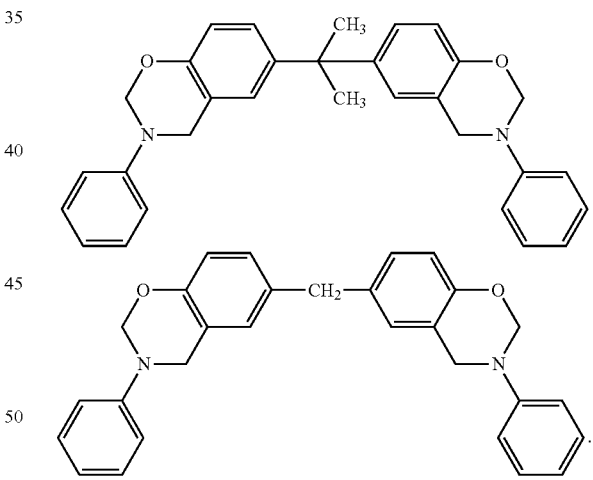

7. A composition in accordance with claim 1 wherein the weight average molecular weight of the polyfluropolyether is from about 200 to about 3,000, and the number average molecular weight thereof is from about 100 to about 2,000 as determined by GPC analysis.

8. A composition in accordance with claim 1 wherein the weight average molecular weight of the benzoxazine is from about 450 to about 3,000, and the number average molecular weight is from about 400 to about 2000 as determined by GPC analysis.

9. A composition in accordance with claim 1 wherein said weight ratio of said functionalized polyfluoropolyether/benzoxazine resin is from about 20/80 to about 80/20.

10. A composition in accordance with claim 1 wherein said polyfluoropolyether is HOCH$_2$OCF$_2$(CF$_2$CF$_2$CF$_2$O)$_n$CF$_2$CH$_2$OH or HOOCOCF$_2$(CF$_2$CF$_2$CF$_2$O)$_n$CF$_2$COOH wherein n represents the number of repeating groups, and is a number of from about 3 to about 25.

11. A composition in accordance with claim 1 wherein said polyfluoropolyether is HOCH$_2$OCF$_2$(CF$_2$CF$_2$CF$_2$O)$_n$CF$_2$CH$_2$OH wherein n represents the number of repeating segments.

12. A composition in accordance with claim 3 wherein m is from about 10 to about 100, n is from about 10 to about 100, and A$_1$ and A$_2$ are independently one of —CH$_2$OH or —COOH.

13. A composition in accordance with claim 3 wherein m is from about 20 to about 80, n is from about 20 to about 80, and A$_1$ and A$_2$ are —CH$_2$OH.

14. A composition in accordance with claim 1 wherein said polyfluoropolyether is at least one of a hydroxyl terminated polyfluoropolyether, a carboxyl acid terminated polyfluoropolyether, an ester terminated polyfluoropolyether, a silane terminated polyfluoropolyether, and a phosphoric acid terminated polyfluoropolyether, and said benzoxazine is

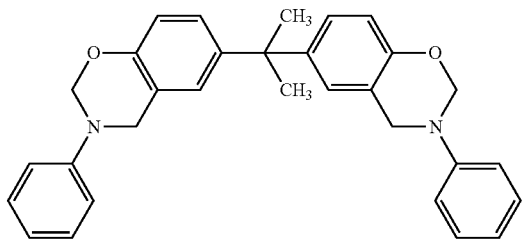 [SMILES: CC(C)(c1ccc2c(c1)CN(c1ccccc1)CO2)c1ccc2c(c1)CN(c1ccccc1)CO2]

or

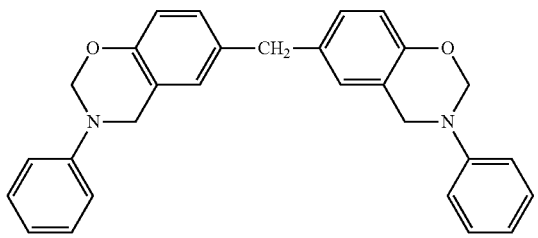

15. A composition in accordance with claim 1 with a water contact angle of from about 90° to about 150°, and a hexadecane contact angle of from about 45° to about 95°.

16. A composition in accordance with claim 1 that possesses both hydrophobic and oleophobic characteristics, and a water contact angle of from about 95° to about 130°, and a hexadecane contact angle of from about 55° to about 80°.

17. A composition consisting of a mixture of a functionalized polyfluoropolyether and a benzoxazine resin with the weight ratio of said functionalized polyfluoropolyether to said benzoxazine resin being from about 20/80 to about 80/20, wherein said polyfluoropolyether is HOCH$_2$OCF$_2$(CF$_2$CF$_2$CF$_2$O)$_n$CF$_2$CH$_2$OH or HOOCOCF$_2$(CF$_2$CF$_2$CF$_2$O)$_n$CF$_2$COOH wherein n represents the number of repeating groups and which composition has a water contact angle of from about 95° to about 130°, and a hexadecane contact angle of from about 45° to about 95°.

18. A composition in accordance with claim 17 wherein n is a number of from about 3 to about 25 in said polyfluoropolyether and said benzoxazine is

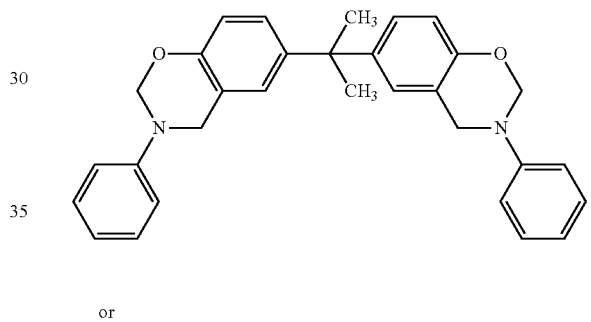

or

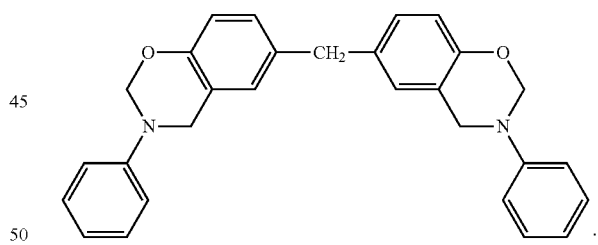

* * * * *